(12) United States Patent
Kaneko

(10) Patent No.: US 10,989,672 B2
(45) Date of Patent: Apr. 27, 2021

(54) DEFECT INSPECTION DEVICE, DEFECT INSPECTION METHOD, AND PROGRAM

(71) Applicant: FUJIFILM Corporation, Tokyo (JP)

(72) Inventor: Yasuhiko Kaneko, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 238 days.

(21) Appl. No.: 16/268,719

(22) Filed: Feb. 6, 2019

(65) Prior Publication Data

US 2019/0170665 A1 Jun. 6, 2019

Related U.S. Application Data

(63) Continuation of application No. PCT/JP2017/022740, filed on Jun. 20, 2017.

(30) Foreign Application Priority Data

Aug. 18, 2016 (JP) .............................. JP2016-160769

(51) Int. Cl.
*G01N 23/04* (2018.01)
*G01N 21/88* (2006.01)
*G06T 7/00* (2017.01)

(52) U.S. Cl.
CPC ............. *G01N 23/04* (2013.01); *G01N 21/88* (2013.01); *G01N 21/8851* (2013.01);
(Continued)

(58) Field of Classification Search
CPC ........ G06T 7/0004; G06T 2207/30108; G01N 21/88; G01N 21/8851; G01N 23/04;
(Continued)

(56) References Cited

U.S. PATENT DOCUMENTS

2014/0328459 A1 11/2014 Urano et al.

FOREIGN PATENT DOCUMENTS

| JP | 08-96136 A | 4/1996 |
|---|---|---|
| JP | 2002-296022 A | 10/2002 |

(Continued)

OTHER PUBLICATIONS

International Search Report for PCT/JP2017/022740 dated Sep. 12, 2017 [PCT/ISA/210].
(Continued)

*Primary Examiner* — Mark R Gaworecki
(74) *Attorney, Agent, or Firm* — Sughrue Mion, PLLC

(57) ABSTRACT

A defect inspection device, a defect inspection method, and a computer readable medium accurately and rapidly detect a minute defect and a defect candidate indicated by a signal in a received light image of an inspection object. A defect inspection device includes an image acquisition unit, an input unit, an exposure condition acquisition unit, memory, and a parameter determination unit that determines an image processing parameter for a received light image based on an exposure condition acquired by the exposure condition acquisition unit, a physical feature received by the input unit, and exposure information stored in memory, and an image processing unit extracts a defect candidate image which corresponds to a defect candidate of the inspection object from the received light image by performing image processing of the received light image based on the image processing parameter determined by the parameter determination unit.

20 Claims, 13 Drawing Sheets

(52) U.S. Cl.
CPC .... *G06T 7/0004* (2013.01); *G01N 2021/8883* (2013.01); *G01N 2223/03* (2013.01); *G01N 2223/052* (2013.01); *G01N 2223/401* (2013.01); *G01N 2223/646* (2013.01); *G06T 2207/30108* (2013.01)

(58) Field of Classification Search
CPC ....... G01N 2021/8883; G01N 2223/03; G01N 2223/052; G01N 2223/401; G01N 2223/646
See application file for complete search history.

(56) References Cited

FOREIGN PATENT DOCUMENTS

| | | |
|---|---|---|
| JP | 2002-323461 A | 11/2002 |
| JP | 2006-300888 A | 11/2006 |
| JP | 2009-168740 A | 7/2009 |
| JP | 2010-281648 A | 12/2010 |
| JP | 2013-178242 A | 9/2013 |
| WO | WO-2013118386 A1 * | 8/2013 ........... G01N 23/083 |

OTHER PUBLICATIONS

International Preliminary Report on Patentability with Translation of Written Opinion for PCT/JP2017/022740 dated Feb. 19, 2019.
Written Opinion for PCT/JP2017/022740 dated Sep. 12, 2017 [PCT/ISA/237].

* cited by examiner

FIG. 15
X-RAY IRRADIATION DIRECTION
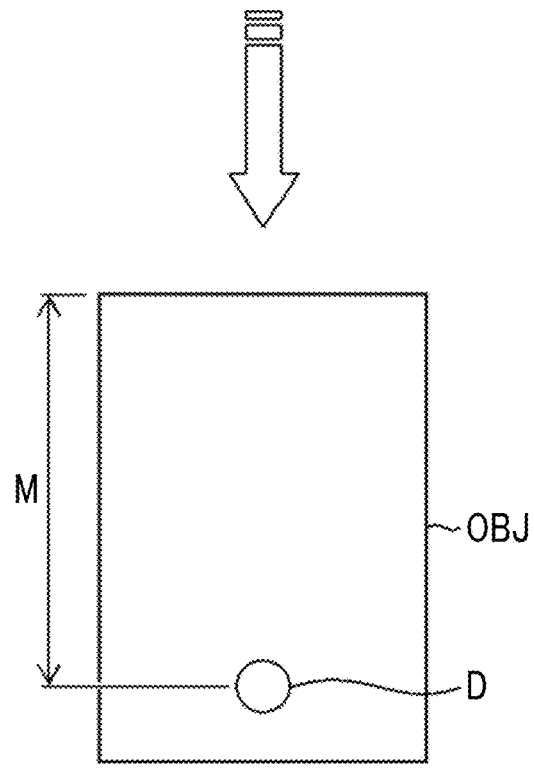
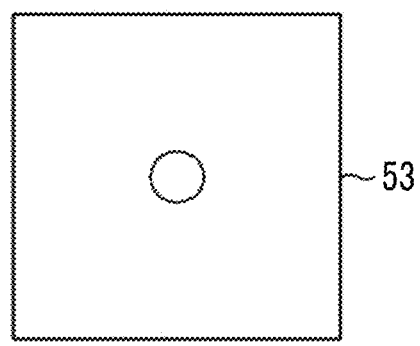

FIG. 16
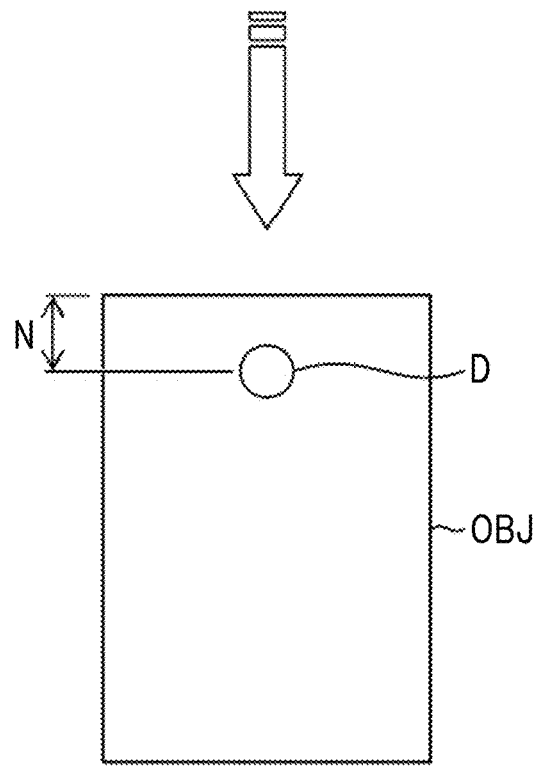
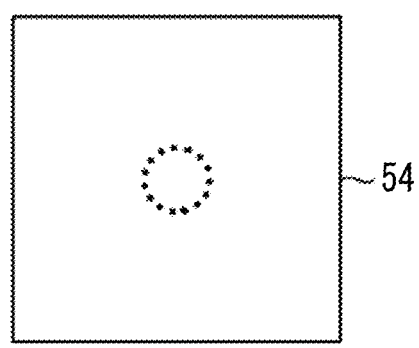

DEFECT INSPECTION DEVICE, DEFECT INSPECTION METHOD, AND PROGRAM

CROSS-REFERENCE TO RELATED APPLICATIONS

The present application is a Continuation of PCT International Application No. PCT/JP2017/022740 filed on Jun. 20, 2017 claiming priority under 35 U.S.C § 119(a) to Japanese Patent Application No. 2016-160769 filed on Aug. 18, 2016. Each of the above applications is hereby expressly incorporated by reference, in their entirety, into the present application.

BACKGROUND OF THE INVENTION

1. Field of the Invention

The present invention relates to a defect inspection device, a defect inspection method, and a program, and more particularly, to a defect inspection device, a defect inspection method, and a program for supporting inspection of defects using images of industrial products that are inspection targets.

2. Description of the Related Art

JP1996-096136A (JP-H08-096136A) relates to a technique of performing defect identification from a radiation transmission image of a welding defect. In the technique described in JP1996-096136A (JP-H08-096136A), a concentration abnormality area in which image processing is performed on acquired image data is detected as a defect candidate image, and a welding condition or the like is also added to a feature parameter such as a shape and concentration of the detected defect candidate, thereby identifying a defect, a non-defect, and a type of defect.

In addition, JP2010-281648A relates to a technique for performing a determination of a defect from an image of a metal material obtained by irradiation with radiation. In the technique described in JP2010-281648A, a relative position between the inspection object and an irradiation area of the radiation is changed a plurality of times, and it is determined whether or not a defect is included on the basis of a radiation transmission image acquired for each changed position.

SUMMARY OF THE INVENTION

Here, in examination and inspection of industrial products, accurately and rapidly detecting a minute defect and a defect represented by a minute signal (image data) in a received light image acquired by imaging the inspection object is required.

However, JP1996-096136A (JP-H08-096136A) does not particularly mention accurately and rapidly detecting a minute defect and a defect indicated by a minute signal in a case where a concentration abnormality area in which image processing is performed on acquired image data is detected as a defect candidate image. In addition, in JP2010-281648A, a relative position between the inspection object and the irradiation area of the radiation should be changed a plurality of times for imaging of the inspection object, and the inspection takes time.

The present invention has been made in view of the above circumstances, and an object of the present invention is to provide a defect inspection device, a defect inspection method, and a program capable of accurately and rapidly detecting a minute defect and a defect indicated by a minute signal in a received light image of an inspection object.

In order to achieve the above object, a defect inspection device according to an aspect of the present invention includes an image acquisition unit that acquires a received light image created on the basis of transmitted light or reflected light of an inspection object obtained by irradiating the inspection object with radiation; an input unit that receives an input of a physical feature including at least a material of the inspection object; an exposure condition acquisition unit that acquires an exposure condition of the radiation; a storage unit that stores exposure information that is a relationship among the physical feature, an irradiation condition of the radiation, and shading of the received light image; a parameter determination unit that determines an image processing parameter for the received light image on the basis of the exposure condition acquired by the exposure condition acquisition unit, the physical feature received by the input unit, and the exposure information stored in the storage unit; and an image processing unit that extracts a defect candidate image which is an image corresponding to a defect candidate of the inspection object from the received light image by performing image processing of the received light image on the basis of the image processing parameter determined by the parameter determination unit.

According to this aspect, the parameter determination unit determines an image processing parameter for the received light image on the basis of the exposure condition acquired by the exposure condition acquisition unit, the physical feature received by the input unit, and the exposure information stored in the storage unit. That is, the determined image processing parameter is an image processing parameter according to the condition in which the received light image has been captured, and is an image processing parameter suitable for the shading of the received light image. Thus, in the aspect, detection of a minute defect and a defect candidate image indicated by a minute signal in the received light image through image processing is accurately and rapidly performed.

Preferably, the parameter determination unit calculates a shading condition corresponding to a thickness of the inspection object on the basis of the exposure condition acquired by the exposure condition acquisition unit, the physical feature received by the input unit, and the exposure information stored in the storage unit and calculates a noise level of the received light image on the basis of the calculated shading condition and the received light image acquired by the image acquisition unit to determine the image processing parameter.

According to this aspect, the shading condition corresponding to the thickness of the inspection object is calculated on the basis of the exposure condition acquired by the exposure condition acquisition unit, the physical feature received by the input unit, and the exposure information stored in the storage unit, by the parameter determination unit. The noise level of the received light image is calculated on the basis of the calculated shading condition and the received light image acquired by the image acquisition unit, thereby determining the image processing parameter, by the parameter determination unit. Thus, in the aspect, it is possible to determine the image processing parameter based on the noise level of the received light image.

Preferably, the image acquisition unit acquires a plurality of the received light images of the inspection object, the exposure condition acquisition unit acquires the exposure condition of each of the plurality of received light images, and the parameter determination unit calculates the shading condition of each of the plurality of received light images and calculates the noise level on the basis of the calculated shading condition of the plurality of received light images and the plurality of received light images acquired by the image acquisition unit, to determine the image processing parameters.

According to this aspect, the plurality of received light images are acquired by the image acquisition unit, the exposure condition of each of the plurality of received light images is acquired by the exposure condition acquisition unit, and the shading condition of each of the plurality of received light images is calculated by the parameter determination unit. The noise level of the received light image is calculated on the basis of the calculated shading condition and the plurality of received light images acquired by the image acquisition unit, thereby determining the image processing parameters, by the parameter determination unit. Accordingly, in the aspect, it is possible to determine the image processing parameter based on an accurate noise level according to the imaging condition of the received light image.

Preferably, the defect inspection device further includes: a thickness calculation unit that calculates a thickness of each local area of the inspection object on the basis of the received light image acquired by the image acquisition unit, the exposure condition acquired by the exposure condition acquisition unit, and the exposure information stored in the storage unit, wherein the parameter determination unit determines the image processing parameter corresponding the thickness of each local area of the inspection object calculated by the thickness calculation unit.

According to this aspect, the thickness of each local area of the inspection object is calculated on the basis of the received light image, the exposure condition, and the exposure information by the thickness calculation unit, and the image processing parameter is calculated on the basis of the calculated thickness of each local area, the exposure condition, the physical feature, and the exposure information by the parameter determination unit. Thus, according to the aspect, since the image processing parameter corresponding to the calculated thickness of the inspection object for each local area is determined, accurate and rapid defect detection is performed.

Preferably, the defect inspection device further includes: a thickness calculation unit that calculates a thickness of each local area of the inspection object on the basis of the received light image acquired by the image acquisition unit, the exposure condition acquired by the exposure condition acquisition unit, and the exposure information stored in the storage unit, wherein the storage unit further stores a noise level according to the thickness of the inspection object, and the parameter determination unit determines the image processing parameter for each local area of the inspection object from the thickness of each local area of the inspection object calculated by the thickness calculation unit and the noise level stored in the storage unit.

According to this aspect, the noise level according to the thickness of the inspection object is stored in the storage unit, and the thickness of each local area of the inspection object is calculated on the basis of the received light image, the exposure condition, and the exposure information by the thickness calculation unit. Since the image processing parameter is determined on the basis of the noise level stored in the storage unit and the thickness of each local area calculated by the thickness calculation unit, by the parameter determination unit, the image processing parameter corresponding to the noise level according to the thickness of each local area of the inspection object is determined.

Preferably, the storage unit stores a plurality of pieces of the exposure information.

According to this aspect, since the plurality of pieces of exposure information are stored in the storage unit, the image processing parameter corresponding to various physical features of the inspection object and/or various irradiation conditions is determined by the parameter determination unit.

Preferably, the storage unit stores the exposure information based on an exposure diagram.

According to this aspect, the exposure information based on the exposure diagram is stored by the storage unit. In the exposure diagram, the physical feature of the inspection object, the irradiation condition, and the shading relationship of the received light image are shown. Thus, the physical feature of the inspection object, the irradiation condition, and the shading relationship of the received light image are stored in the storage unit of the aspect.

Preferably, the defect inspection device further includes a depth calculation unit that calculates a depth from a surface of the inspection object to a position of the defect candidate on the basis of the received light image acquired by the image acquisition unit, the exposure condition acquired by the exposure condition acquisition unit, and the exposure information stored in the storage unit.

According to this aspect, the depth from the surface of the inspection object to the position of the defect candidate is calculated on the basis of the received light image, the exposure condition, and the exposure information. Thus, in this aspect, it is possible to provide the user with the depth from the surface of the inspection object to the position of the defect candidate.

Preferably, the physical feature regarding the material includes at least one of a density or an atomic number of the inspection object.

According to this aspect, since the physical feature includes at least one of the density or the atomic number of the inspection object, the parameter determination unit determines the image processing parameter according to at least one of the density or the atomic number of the inspection object.

Preferably, the irradiation condition is at least one of an irradiation intensity or an irradiation time of the radiation.

According to this aspect, since the irradiation condition is at least one of the irradiation intensity or the irradiation time of the radiation, the parameter determination unit determines the image processing parameter according to the irradiation intensity and the irradiation time of the radiation.

Preferably, the input unit receives an input of a thickness of the inspection object as the physical feature, and the exposure condition acquisition unit calculates an appropriate exposure condition on the basis of the thickness and the material which are the physical features of the inspection object, and the exposure information stored in the storage unit to thereby acquire the exposure condition.

According to this aspect, the input of the thickness of the inspection object is received as the physical feature by the input unit, and the appropriate exposure condition is calculated on the basis of the thickness and the material which are the physical features of the inspection object, and the exposure information stored in the storage unit by the exposure condition acquisition unit, thereby acquiring the exposure condition. Thus, in the aspect, the calculated appropriate exposure condition is used as the exposure condition, and the image processing parameter is determined by the parameter determination unit.

Preferably, the exposure condition acquisition unit acquires information on a state of a radiation source in a case where the received light image acquired by the image acquisition unit has been created, and calculates the exposure condition on the basis of the information on the state of the radiation source.

According to this aspect, the information on a state of the radiation source is acquired by the exposure condition acquisition unit, and the exposure condition is calculated on the basis of the acquired information on the state of the radiation source. Thus, in the aspect, the exposure condition is acquired on the basis of the information on the state of the radiation source even when the exposure condition is not directly input to the exposure condition acquisition unit.

A defect inspection method according to another aspect of the present invention includes an image acquisition step of acquiring a received light image created on the basis of transmitted light or reflected light of an inspection object obtained by irradiating the inspection object with radiation; an input step of receiving an input of a physical feature including at least a material of the inspection object; an exposure condition acquisition step of acquiring an exposure condition of the radiation; a storage step of storing exposure information that is a relationship among the physical feature, an irradiation condition of the radiation, and shading of the received light image; a parameter determination step of determining an image processing parameter for the received light image on the basis of the exposure condition acquired in the exposure condition acquisition step, the physical feature received in the input step, and the exposure information stored in the storage step; and an image processing step of extracting a defect candidate image which is an image corresponding to a defect candidate of the inspection object from the received light image by performing image processing of the received light image on the basis of the image processing parameter determined in the parameter determination step.

A defect inspection program according to another aspect of the present invention causes a computer to realize: an image acquisition step of acquiring a received light image created on the basis of transmitted light or reflected light of an inspection object obtained by irradiating the inspection object with radiation; an input step of receiving an input of a physical feature including at least a material of the inspection object; an exposure condition acquisition step of acquiring an exposure condition of the radiation; a storage step of storing exposure information that is a relationship among the physical feature, an irradiation condition of the radiation, and shading of the received light image; a parameter determination step of determining an image processing parameter for the received light image on the basis of the exposure condition acquired in the exposure condition acquisition step, the physical feature received in the input step, and the exposure information stored in the storage step; and an image processing step of extracting a defect candidate image which is an image corresponding to a defect candidate of the inspection object from the received light image by performing image processing of the received light image on the basis of the image processing parameter determined in the parameter determination step. A computer-readable non-transitory tangible medium on which the defect inspection program is recorded is also included in the aspect of the present invention.

According to the present invention, the parameter determination unit determines the image processing parameter for the received light image on the basis of the exposure condition acquired by the exposure condition acquisition unit, the physical feature received by the input unit, and the exposure information stored in the storage unit, and the determined image processing parameter is an image processing parameter according to the condition in which the received light image has been captured, and is an image processing parameter suitable for the shading of the received light image. Therefore, in the present invention, detection of a minute defect and a defect candidate image indicated by a minute signal in the received light image through image processing is accurately and rapidly performed.

BRIEF DESCRIPTION OF THE DRAWINGS

FIG. 15 is a diagram illustrating calculation of a depth.

FIG. 16 is a diagram illustrating calculation of a depth.

DESCRIPTION OF THE PREFERRED EMBODIMENTS

Hereinafter, embodiments of a defect inspection device, a defect inspection method, and a defect inspection program according to the present invention will be described with reference to the accompanying drawings.

First Embodiment

Figure 1:
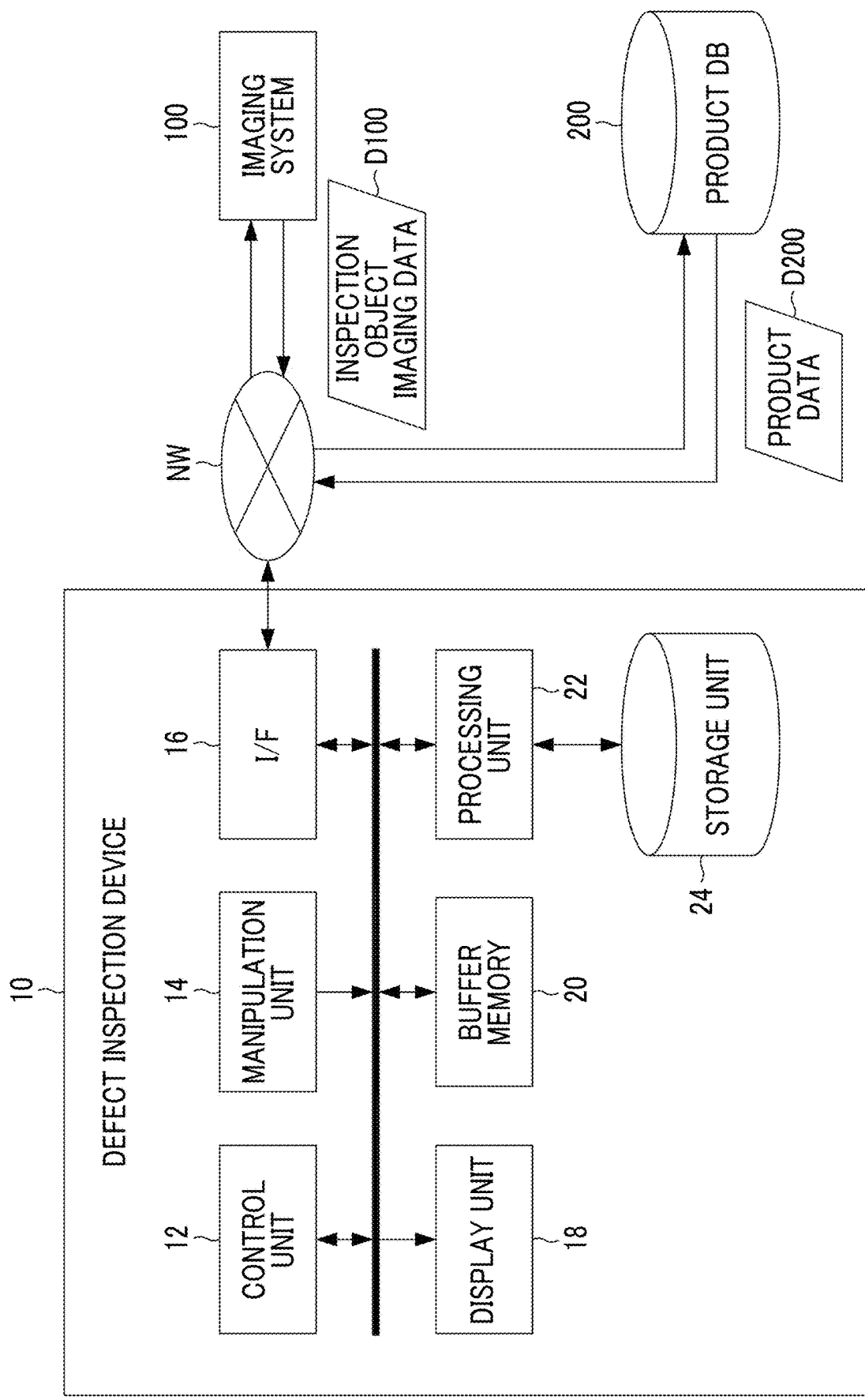
FIG. 1 is a block diagram illustrating a defect inspection device.

FIG. 1 is a block diagram illustrating a defect inspection device 10 according to an embodiment of the present invention.

The defect inspection device 10 according to the first embodiment is a device that detects a candidate of a defect (a defect candidate) from an image obtained by imaging an industrial product that is an inspection target (hereinafter referred to as an inspection object OBJ) and displays the defect candidate, and is a device for supporting diagnosis of the defect of the inspection object OBJ by an image interpreter. Here, the image interpreter is a person who uses the defect inspection device 10 to interpret a defect of the inspection object OBJ from the received light image of the inspection object OBJ. In the following description, an application example of the present invention in a defect inspection through image interpretation will be described, but the application example of the present invention is not limited to thereto. For example, the present invention is also applied to an inspection in which an extracted defect candidate image is determined to be a defect without image interpretation. In addition, the inspection object OBJ is a target of an inspection and various things are assumed. Particularly, an industrial product which is an industrial part requiring high precision design is assumed to be the inspection object OBJ. Further, the received light image is an image created on the basis of transmitted light or reflected light of the inspection object OBJ obtained by irradiating the inspection object OBJ with radiation.

As illustrated in FIG. 1, the defect inspection device 10 according to the first embodiment includes a control unit 12, a manipulation unit 14, an input and output interface (hereinafter referred to as an interface (I/F)) 16, a display unit 18, a buffer memory 20, a processing unit 22, and a storage unit 24.

The control unit 12 includes a central processing unit (CPU) that controls an operation of each unit of the defect inspection device 10. The control unit 12 functions as a display control unit, receives a manipulation input from an image interpreter via the manipulation unit 14, transmits a control signal corresponding to the manipulation input to each unit of the defect inspection device 10, and controls the operation of each unit. For example, the control unit 12 performs display control to display or not to display an auxiliary indication on the display unit 18 on the basis of a command output from the manipulation unit 14. Here, the auxiliary indication is a display indicating a position of the defect candidate image and the classification of the defect candidate image, and is displayed together with the defect candidate image on the display unit 18. The image interpreter can perform image interpretation more accurately and rapidly by performing image interpretation while viewing the auxiliary indication displayed on the display unit 18.

The manipulation unit 14 is an input device that receives a manipulation input from the image interpreter and includes a keyboard for inputting characters, a pointing device (a mouse, a trackball, or the like) for manipulating a pointer, an icon, or the like displayed on the display unit 18. As the manipulation unit 14, a touch panel may be provided on a surface of the display unit 18 in place of or in addition to the means listed above. For example, the manipulation unit 14 receives selection of display or non-display of the auxiliary indication on the display unit 18, and outputs a command for the selected display or non-display of the auxiliary indication to the control unit 12.

The I/F 16 is means for communicating with an external device via a network NW. Wired communication (for example, local area network (LAN), wide area network (WAN), or Internet connection) or wireless communication (for example, LAN, WAN, Internet connection) can be used as a method of transmitting and receiving data between the defect inspection device 10 and the external device. The I/F 16 functions as an image acquisition unit and acquires a received light image created on the basis of reflected light or transmitted light from the inspection object OBJ, which is obtained by irradiating the inspection object OBJ with light rays or radiation.

The I/F 16 also functions as an exposure condition acquisition unit. That is, the I/F 16 acquires the exposure condition of the radiation in a case where the received light image acquired by the image acquisition unit has been created. Here, the exposure condition is a condition of exposure in a case where the inspection object OBJ is exposed to the radiation and is indicated by, for example, a tube voltage, an irradiation time, or the tube voltage and the irradiation time.

The exposure condition that is input to the I/F 16 may be an exposure condition measured in a case where the acquired received light image has been captured by a dosimeter attached to the outside. Further, for example, the I/F 16 may acquire information on a state of the radiation source in a case where the acquired received light image has been created, and calculate the exposure condition on the basis of the information on the state of the radiation source. In this case, known dose calculation software is used in the I/F 16. Further, for example, the I/F 16 acquires the exposure condition by calculating an appropriate exposure condition on the basis of the thickness and the material which are physical features of the inspection object OBJ, and the exposure information stored in the storage unit 24. Here, the appropriate exposure condition refers to an exposure condition in which an image (received light image) having the most appropriate shading can be obtained in a case where the inspection object OBJ is irradiated with the radiation and imaged. In general, in a case where the inspection object OBJ is irradiated with radiation and a captured image is acquired, an inspector determines the appropriate exposure condition and performs irradiation by referring to the exposure diagram. Therefore, the received light image is captured under the appropriate exposure condition.

Further, the I/F 16 also functions as an input unit that receives an input of the physical feature of the inspection object OBJ. That is, the I/F 16 receives the physical feature of the inspection object OBJ that is input manually or automatically. Here, the physical feature is not particularly limited as long as the physical feature can physically characterize the inspection object OBJ. For example, the physical feature of the inspection object OBJ includes at least one of a material name (substance name), thickness, density, or atomic number of the inspection object OBJ. The density and the atomic number are physical features regarding the material.

The defect inspection device 10 is able to receive an input of inspection object imaging data D100 including captured image data of the inspection object OBJ imaged by the imaging system 100 via the I/F 16. Here, the captured image data is image data constituting the received light image. Further, a method of inputting the inspection object imaging data D100 from the imaging system 100 to the defect inspection device 10 is not limited to communication via the network NW described above. For example, the defect inspection device 10 and the imaging system 100 may be connected by a universal serial bus (USB) cable, Bluetooth (registered trademark), infrared communication, or the like, and the inspection object imaging data D100 may be stored in a readable memory card that can be attached to or detached from the defect inspection device 10 and image data may be input to the defect inspection device 10 via this memory card.

Further, the defect inspection device 10 can communicate with a product database (product DB) 200 via the network NW. Product data D200 for each industrial product that can be an inspection target is stored in the product DB. The control unit 12 can search for inspection object specifying information for specifying the inspection object OBJ from the inspection object imaging data of the inspection object OBJ acquired from the imaging system 100, read out the inspection object specifying information, and acquire the product data D200 corresponding to the read inspection object specifying information from the product DB 200. By using this product data D200, it is possible to detect the defect candidate according to the type or feature of the inspection object OBJ.

As in the first embodiment, the product DB 200 may be installed on the network NW such that a manufacturer or the like can update the product data D200, or the product DB 200 may be provided in the defect inspection device 10.

The display unit 18 is a device for displaying an image. As the display unit 18, for example, a liquid crystal monitor (see FIG. 7) can be used. The display unit 18 displays the received light image, and the auxiliary indication which is displayed in association with the received light image. The control of the display of the display unit 18 is performed by the control unit 12.

The buffer memory 20 is used as a work area of the control unit 12 and an area for temporarily storing image data that is output to the display unit 18.

The storage unit 24 is means for storing data including a control program that is used by the control unit 12. As the storage unit 24, for example, a device including a magnetic disk such as a hard disk drive (HDD), a device including a flash memory such as an embedded multimedia card (eMMC) or a solid state drive (SSD), or the like can be used.

Further, the storage unit 24 stores exposure information. Here, the exposure information is information indicating a relationship among a physical feature of the inspection object OBJ, an irradiation condition of the radiation, and shading of the received light image. A specific example of the exposure information may include an exposure diagram. The exposure diagram (FIG. 9) shows the shading of the obtained image according to the physical feature of the inspection object OBJ and the irradiation condition of the radiation. The storage unit 24 can store a plurality of pieces of exposure information in which at least one of the physical feature of the inspection target or the irradiation condition of the radiation is different. The storage unit 24 may store the exposure information according to a material, a thickness, a density, and an atomic number of the inspection object OBJ, which are physical features of the inspection object OBJ, and may store a plurality of types of exposure information according to a type of radiation source, a magnitude of the amount of radiation, radiation quality, a tube voltage, a tube current, or the like. For example, in a case where the inspection object OBJ is a metal, the storage unit 24 stores an exposure diagram for each type of metal. Here, the irradiation condition means an irradiation intensity and an irradiation time of the radiation. The exposure diagram may be referred to by various names such as an exposure chart and an exposure curve.

Further, information (data) stored in the storage unit 24 may be updated. For example, the information stored in the storage unit 24 may be updated by sequential storage of interpretation results of the image interpreter in the storage unit 24, in the defect inspection device 10.

Further, the storage unit 24 stores, for example, a calculation table of an image processing parameter according to the thickness. That is, the storage unit 24 stores a calculation table in which the thickness of the inspection object OBJ and the image processing parameter are associated with each other. This calculation table may be stored for each substance of the inspection object OBJ or for each exposure condition. A specific example of the calculation table includes a noise level according to the thickness of the inspection object OBJ, and an image processing parameter is derived according to this noise level.

The processing unit 22 extracts the defect candidate image, which is an image corresponding to the defect candidate of the inspection object OBJ, from the received light image through image processing. Here, the processing unit 22 performs image processing on the basis of the image processing parameters determined by the parameter determination unit 220 (FIG. 2), and extracts the defect candidate image from the received light image. The function of the processing unit 22 will be described below.

The processing unit 22 reads out the captured image data of the inspection object OBJ from the inspection object imaging data D100, and performs image processing on the captured image data to extract defect candidates. The processing unit 22 outputs the captured image data and the information on the defect candidate image indicating a detection result (a feature calculation result) of the detected defect candidate to the buffer memory 20. Using the data output to the buffer memory 20, the control unit 12 creates a display image in which the auxiliary indication has been added to the defect candidate image of the received light image, and displays the display image on the display unit 18. Accordingly, the image interpreter can interpret the image displayed on the display unit 18 and perform inspection of the inspection object OBJ.

The image interpreter can input, for example, diagnosis results such as "The inspection object OBJ is immediately replaced with a new one", "Progress is observed (it is re-inspected after n days)", "Leaving it alone (it is not a defect)" for each of pieces of the information on the defect candidate image attached to the image displayed on the display unit 18 through the manipulation unit 14. The control unit 12 creates inspection object inspection result data D10 (see FIG. 5) including diagnosis result data and stores the inspection object inspection result data D10 in the storage unit 24. Accordingly, the information (data) stored in the storage unit 24 is updated.

Figure 2:
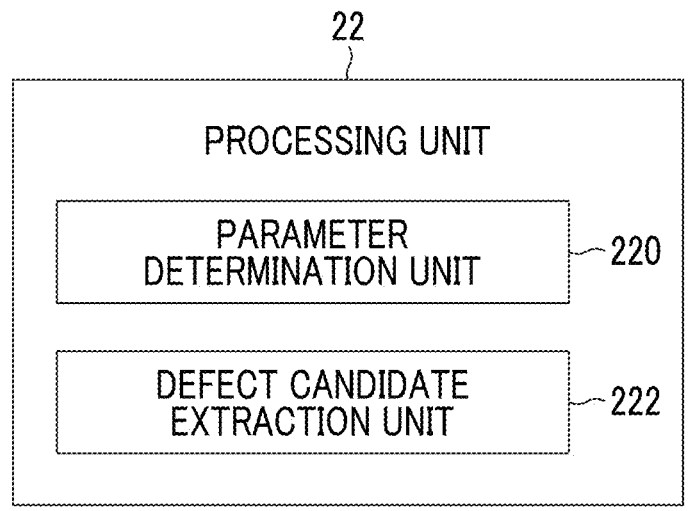
FIG. 2 is a block diagram illustrating an example of a function of a processing unit.

FIG. 2 is a block diagram illustrating an example of functions of the processing unit 22. As illustrated in FIG. 2, the processing unit 22 includes a parameter determination unit 220 and a defect candidate extraction unit 222.

First, the parameter determination unit 220 will be described. The parameter determination unit 220 determines image processing parameters on the basis of the exposure condition acquired by the exposure condition acquisition unit, the physical features received by the input unit, and the exposure information stored in the storage unit 24. Since the determined image processing parameter is determined on the basis of the exposure condition in the exposure diagram corresponding to the physical feature, the image processing parameter according to a condition in which the received light image has been captured is determined. Here, the image processing parameters determined by the parameter determination unit 220 are parameters to be used for image processing on the received light image performed by the defect candidate extraction unit 222, and various parameters are assumed. An example of the image processing parameter may include a threshold value in a case where noise in the received light image is canceled. Further, an example of the image processing parameter may include a threshold value regarding brightness in a case where the defect candidate image is extracted. Here, the noise is random noise that is caused by unevenness in a shape of the inspection object OBJ or scattering of the radiation. The determination of the image processing parameter will be described in detail below.

The defect candidate extraction unit 222 functions as an image processing unit. The defect candidate extraction unit 222 performs detection of candidates for defects (for example, scratches, cracks, abrasion, or rust) of the inspection object OBJ by performing image processing (for example, a color conversion process, a monochrome conversion process, an edge emphasis process, and a process for conversion to three-dimensional data) on the captured image data to detect a change in color, brightness value, or the like of the inspection object OBJ. The defect candidate extraction unit 222 performs detection of the defect on the basis of, for example, a change in color and an edge detection result. Accordingly, a position and a shape of the defect candidate are specified. Here, the defect candidate extraction unit 222 performs image processing on the basis of the image processing parameters determined by the parameter determination unit 220 described above, thereby extracting a defect candidate image that is an image corresponding to a defect candidate of the inspection object OBJ from the received light image. This image processing parameter may be updated or changed for each received light image or may be updated or changed for each area in the received light image in which the image processing is performed.

Incidentally, for example, product image data including an image of a product (a new product) from which the same defect of the inspection object OBJ has not been detected is included in the product data D200, and the product image data may be compared with the captured image data of the inspection object OBJ so that detection of defect candidates is performed.

Figure 3:
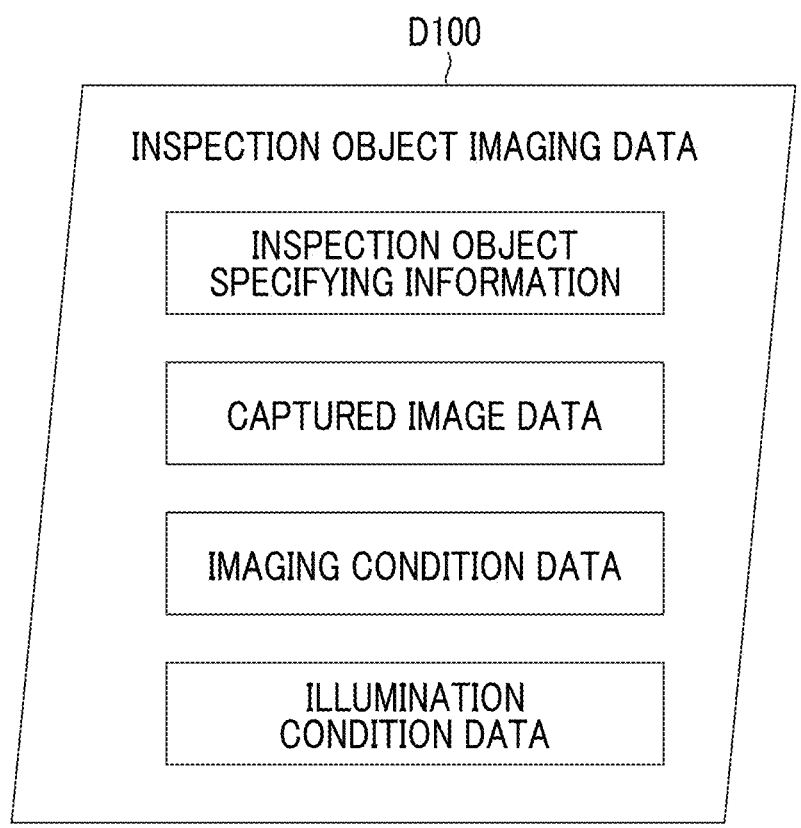
FIG. 3 is a block diagram illustrating an example of inspection object imaging data.

FIG. 3 is a block diagram illustrating an example of inspection object imaging data. As illustrated in FIG. 3, the inspection object imaging data D100 includes inspection object specifying information, captured image data, imaging condition data, and illumination condition data.

The inspection object specifying information is information for specifying the inspection object OBJ, and includes, for example, information indicating a product name, a product number, a manufacturer name, and a technical classification of the inspection object OBJ.

The captured image data is image data (for example, an X-ray image or a visible light image) obtained by imaging the inspection object OBJ.

The imaging condition data is stored for each captured image data of the inspection object OBJ, and includes information on an imaging date and time, an imaging target place of each captured image data, a distance between the inspection object OBJ and a camera at the time of imaging, and an angle with respect to the camera.

The illumination condition data includes information indicating a type (for example, X-rays, visible light rays, transmitted light rays, or reflected light rays), an irradiation intensity, and an irradiation angle of the radiation used for imaging of the inspection object OBJ. That is, the illumination condition data includes the exposure condition of the radiation described above.

Figure 4:
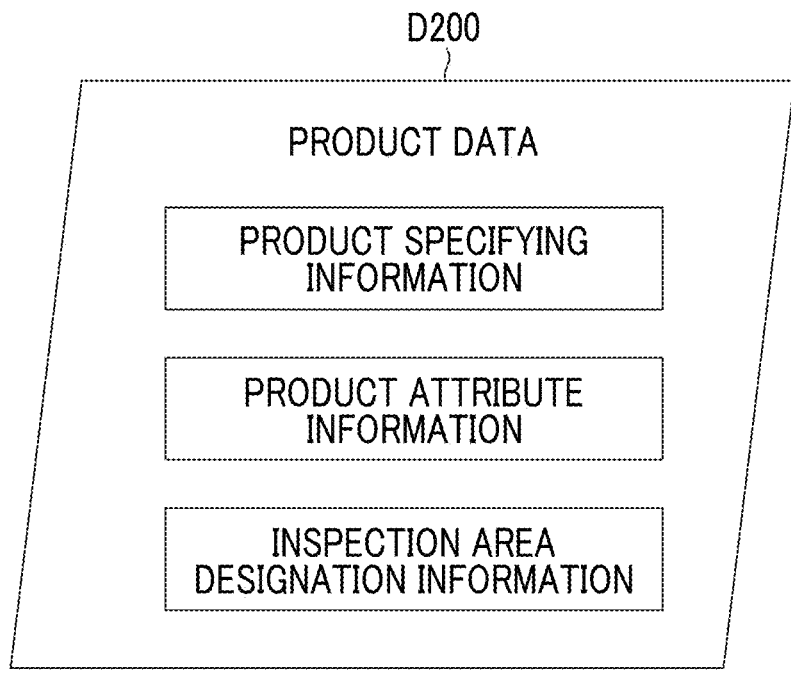
FIG. 4 is a block diagram illustrating an example of product data.

FIG. 4 is a block diagram illustrating an example of product data. As illustrated in FIG. 4, product information includes product specifying information, product attribute information, and inspection area designation information. The product data D200 may be recorded in the storage unit 24 in association with the inspection object imaging data D100 and the inspection object inspection result data D10 via the inspection object specifying information and the product specifying information, or may be acquired from the product DB 200 each time the defect inspection is performed.

The product specifying information is information for specifying a product, and includes, for example, information indicating a product name, a product number, a manufacturer name, and a technical classification.

The product attribute information includes, for example, information indicating a material and size of each portion of the product, and a usage of the product. Information indicating the use of the product includes, for example, information on a name, a type, a processing state, and an attachment method (for example, a junction portion, a welded portion, screwing, fitting, or soldering) of a device or the like to which the product is attached. In addition, the product attribute information includes defect generation information. The defect generation information includes, for example, at least one information among a past inspection date and time, a material of the inspection object OBJ, a type of defect (for example, a foreign matter or a crack) generated in the past, a shape, a size, a depth, an generation site (site coordinates, a wall thickness of the material, a processing state (for example, a junction portion or a welded portion)), frequency information on a defect generation frequency, and a capture image of the defect.

The inspection area designation information includes information indicating an inspection area designated by a manufacturer or the like of each product (for example, which is information including a position of the inspection area, and is created on the basis of defect generation information such as presence or absence of a defect occurred in the past and frequency information on a frequency of defect generation). The inspection area designation information is created, for example, by specifying a place at which it is easy for a defect to occur statistically or structurally on the basis of information in a case where the manufacturer or the like has repaired the product in the past.

In a case where the defect candidate is detected from the inspection object OBJ, the processing unit 22 is able to increase detection accuracy of the defect candidate with respect to the inspection area designated by the inspection area designation information (for example, decrease a minimum size (a threshold value of the size) of scratches or the like and a threshold value of depth of a crack detected as the defect candidate). In addition, in a case where the image of the inspection object OBJ and the image of the defect candidate are displayed on the display unit 18, a process of assigning the captured image data of the inspection area, a mark for identifying the defect candidate detected from a detection target area, and the like, and emphasizing these may be performed.

In a case where a product has a plurality of uses, the inspection area designation information is created for each use of the product (for example, a type of device to which the product is attached, or an installation place), and a defect candidate may be detected using the inspection area designation information corresponding to the designated use.

In a case where there is no product data in which a product name or a product number matches, product data of a product having a similar technical classification may be acquired and used for image processing.

Figure 5:
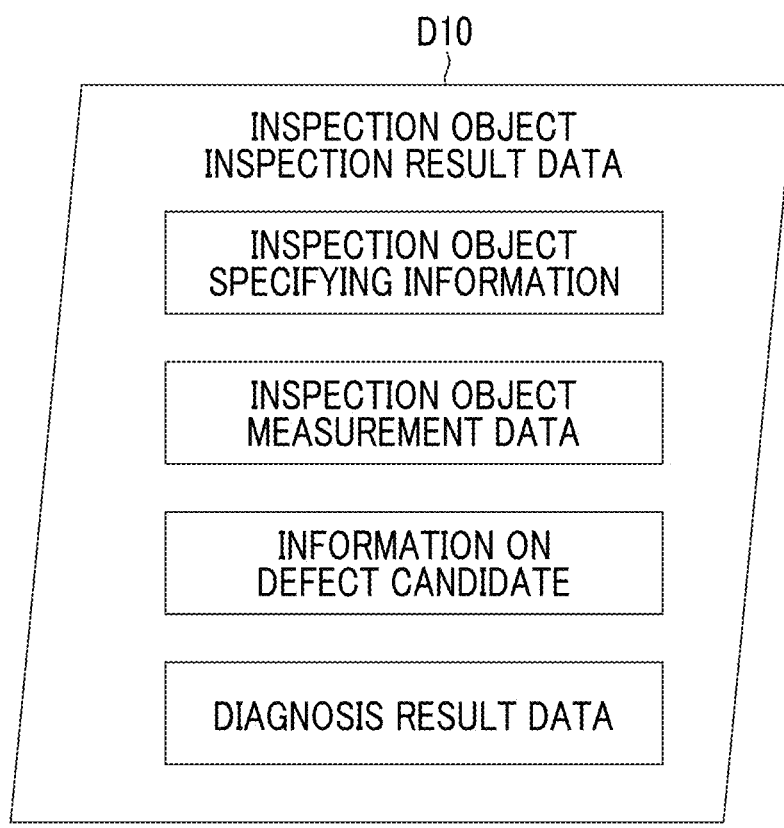
FIG. 5 is a block diagram illustrating an example of inspection object inspection result data.

FIG. 5 is a block diagram illustrating an example of the inspection object inspection result data. As illustrated in FIG. 5, the inspection object inspection result data D10 includes inspection object measurement data, information on defect candidate images, and diagnosis result data, in addition to the inspection object specifying information. The inspection object inspection result data D10 is recorded in the storage unit 24 in association with the inspection object imaging data D100 via the inspection object specifying information.

The inspection object measurement data includes information indicating measurement results of a size of the inspection object OBJ and a wall thickness of the inspection object OBJ at each position to be described below.

The diagnosis result data includes date and time of inspection, and information that the image interpreter has additionally input for the defect candidate. The diagnosis result data is, for example, "It is a defect. The classification is stain-like.", "It is a defect. The classification is a foreign object shadow", or "It is not a defect". Further, the diagnosis result data may include information indicating the diagnosis result input by the image interpreter, such as "The inspection object OBJ is immediately replaced with a new one", "Progress is observed (it is re-inspected after n days)", "Leaving it alone (it is not a defect)".

It should be noted that the inspection object inspection result data D10 may include a part of inspection object imaging data D100 and product data D200.

Further, the inspection object inspection result data D10 may be transmitted to and accumulated in the product DB 200, and the inspection area designation information of the product data D200 may be updated using the information on the defect candidate and a result of analyzing the diagnosis result data included in the inspection object inspection result data D10.

Figure 6:
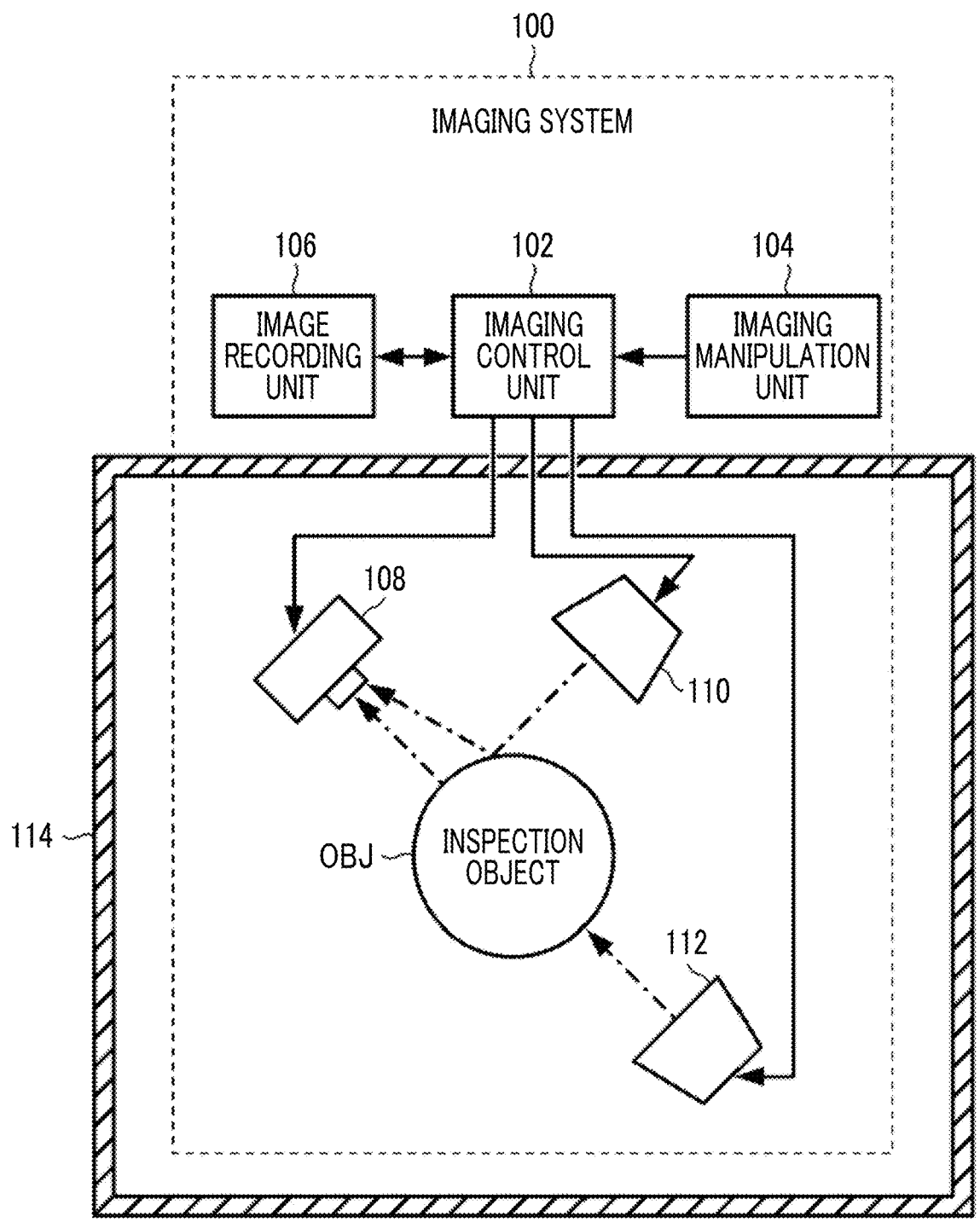
FIG. 6 is a block diagram illustrating an example of an imaging system.

Next, the imaging system 100 for capturing an image of an inspection object OBJ will be described. FIG. 6 is a block diagram illustrating an example of the imaging system 100.

As illustrated in FIG. 6, the imaging system 100 is for imaging the inspection object OBJ placed in an imaging room 114, and includes an imaging control unit 102, an imaging manipulation unit 104, an image recording unit 106, a camera 108, and radiation sources 110 and 112.

The imaging control unit 102 includes a central processing unit (CPU) that controls an operation of each unit of the imaging system 100. The imaging control unit 102 receives a manipulation input from an operator (a photographer) via the imaging manipulation unit 104, and transmits a control signal according to the manipulation input to each unit of the imaging system 100 to control an operation of each unit.

The imaging manipulation unit 104 is an input device that receives a manipulation input from an operator, and includes a keyboard for inputting characters, and a pointing device (a mouse, a trackball, or the like) for manipulating a pointer, an icon, or the like displayed on the display unit 18. Through the imaging manipulation unit 104, the operator can perform an input of information on the inspection object OBJ, an input of an instruction to instruct the camera 108 to execute imaging (including a setting of imaging conditions such as an exposure time, a focal length, and a stop, an imaging angle, an imaging place, or the like), an input of an instruction to instruct the radiation sources 110 and 112 to radiate radiation (including a setting of an irradiation start time, an irradiation duration time, an irradiation angle, an irradiation intensity, or the like), and an input of an instruction to record the acquired image data in the image recording unit 106.

The image recording unit 106 records the image data (received light image) of the inspection object OBJ captured by the camera 108. Information for specifying the inspection object OBJ is recorded in association with the image data in the image recording unit 106.

The camera 108 and the radiation sources 110 and 112 are disposed inside the imaging room 114. The radiation sources 110 and 112 are, for example, X-ray sources. X-ray protection is performed by an X-ray protection material (for example, lead or concrete) at a partition wall between the imaging room 114 and the outside and an entrance and an exit. In a case where imaging is performed through irradiation of the inspection object OBJ with visible light, it is not necessary for the protected imaging room 114 to be used.

The radiation sources 110 and 112 irradiate the inspection object OBJ placed in the imaging room 114 with radiation according to an instruction from the imaging control unit 102.

According to an imaging execution instruction from the imaging control unit 102, the camera 108 receives the radiation radiated from the radiation source 110 to the inspection object OBJ and reflected from the inspection object OBJ or the radiation radiated from the radiation source 112 to the inspection object OBJ and transmitted through the inspection object OBJ and images the inspection object OBJ. The inspection object OBJ is held in the imaging room 114 by a holding member (not shown) (for example, a manipulator, a placing stage, or a movable placing stage), and a distance and an angle of the inspection object OBJ with respect to the camera 108 and the radiation sources 110 and 112 can be adjusted. An operator can control relative positions of the inspection object OBJ, the camera 108, and the radiation sources 110 and 112 via the imaging control unit 102, and image a desired place of the inspection object OBJ.

The radiation sources 110 and 112 end the radiation of the radiation to the inspection object OBJ in synchronization with the end of the imaging of the camera 108.

Although the camera 108 is disposed inside the imaging room 114 in the example illustrated in FIG. 6, the camera 108 may be disposed in the outside as long as the camera 108 is able to image the inspection object OBJ in the imaging room 114.

Further, in the example illustrated in FIG. 6, one camera 108 and two radiation sources 110 and 112 are provided, but the number of cameras and radiation sources is not limited to thereto. For example, a plurality of cameras and a plurality of radiation sources may be provided or one camera and one radiation source may be provided.

Figure 7:
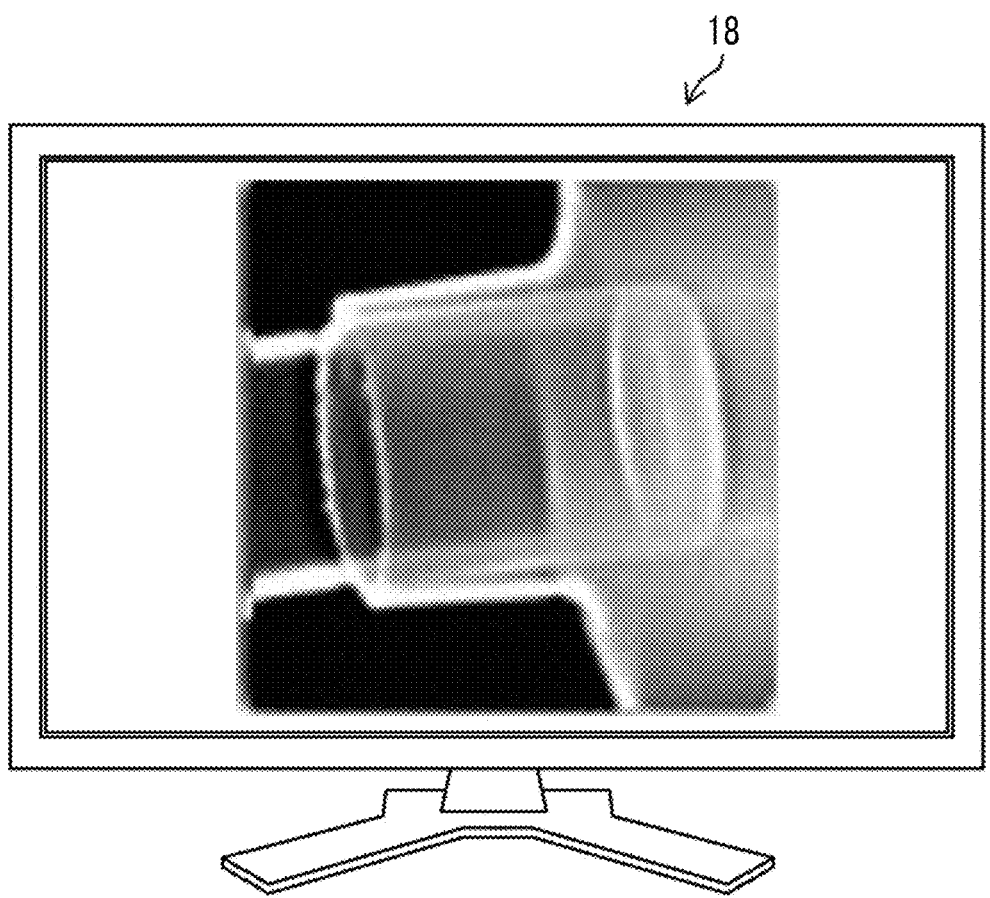
FIG. 7 is a front view illustrating an appearance of a display unit.

FIG. 7 is a front view illustrating an appearance of the display unit 18 of the defect inspection device 10. As illustrated in FIG. 7, a liquid crystal monitor is an example of the display unit 18. Besides, a specific example of the display unit 18 may include a display screen of a smartphone or a display screen of a mobile terminal.

Figure 8:
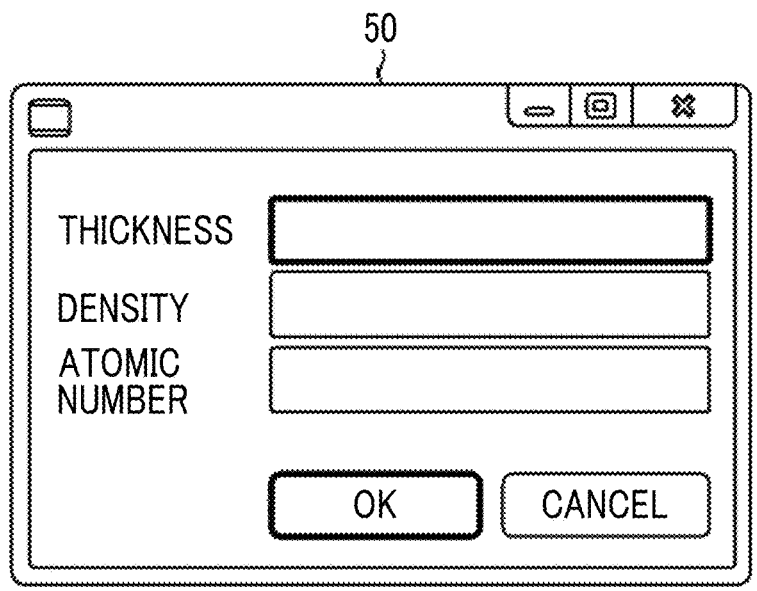
FIG. 8 is a diagram illustrating an example of an input screen for inputting a physical feature.

FIG. 8 is a diagram illustrating an example of an input screen (graphical user interface (GUI)) for inputting physical features of the inspection object OBJ. The input screen 50 is displayed on the display unit 18 of the defect inspection device 10. For example, a user inputs physical features of the inspection object OBJ via the manipulation unit 14. In the example illustrated in FIG. 8, the input screen 50 enables a thickness, a density, and an atomic number of the inspection object OBJ to be input. The physical features of the inspection object OBJ input on the input screen 50 are received by the I/F 16.

Figure 9:
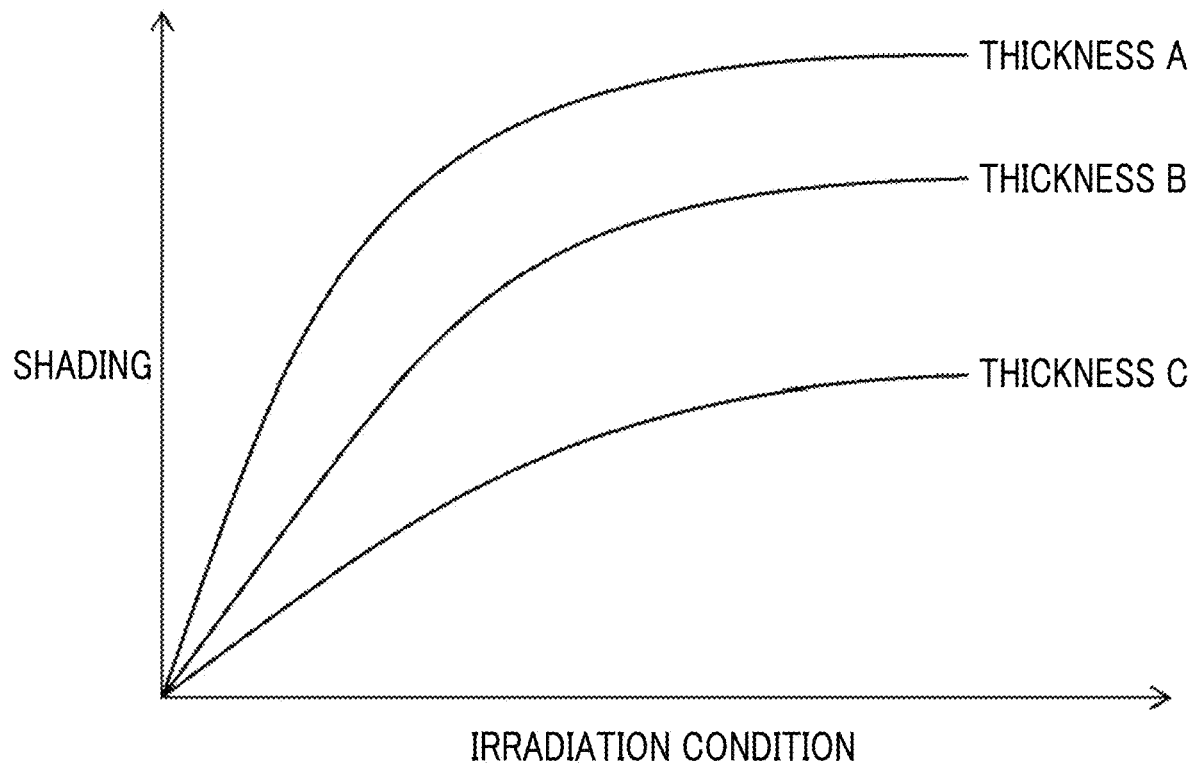
FIG. 9 is a diagram illustrating an exposure diagram which is an example of exposure information.

FIG. 9 is a diagram illustrating an exposure diagram which is an example of the exposure information stored in the storage unit 24. In the exposure diagram illustrated in FIG. 9, an X axis indicates an irradiation condition (for example, a tube voltage), and a Y axis indicates a shading of received light image. In addition, FIG. 9 shows that different characteristics are exhibited at thicknesses A, B and C of the inspection object OBJ. The exposure diagram is used by an inspector to know an appropriate exposure condition in a case where the radiation is radiated in the imaging system 100 described with reference to FIG. 6. That is, in a case where the inspector captures a radiation image of the inspection object OBJ, the inspector sets an appropriate exposure condition on the basis of the exposure diagram and performs imaging.

Figure 10:
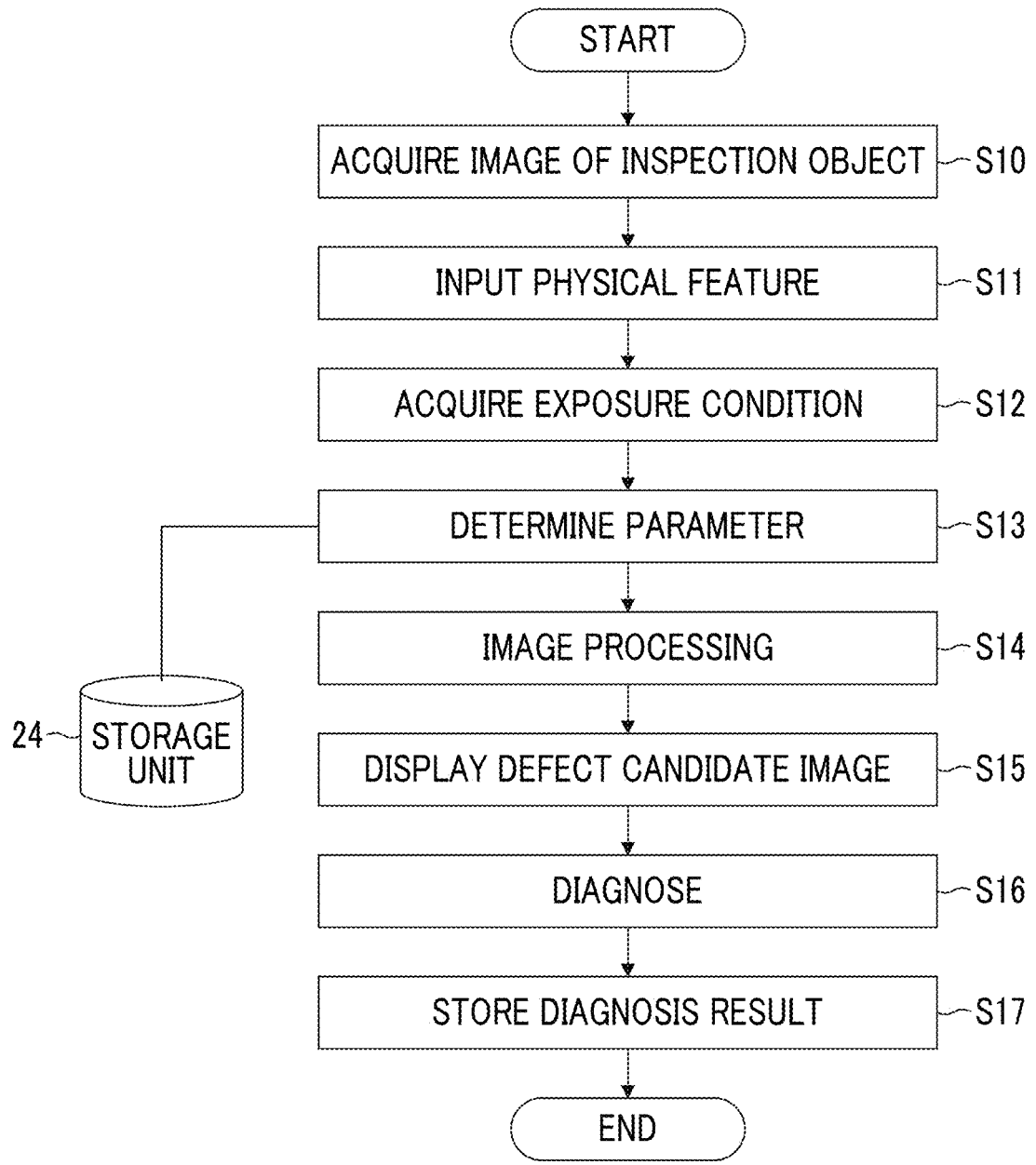
FIG. 10 is a diagram illustrating an operation flow of a defect inspection device.

FIG. 10 is a diagram illustrating an operation flow of the defect inspection device 10.

First, the image acquisition unit (I/F 16) acquires the received light image of the inspection object OBJ (image acquisition step: step S10). Then, input of a physical feature of the inspection object OBJ is received by the input unit (input step: step S11). Information on a physical feature including at least a material of the inspection object OBJ is received by the input unit. For example, an atomic number of a metal element, a type and ratio of an alloy, or a density of the inspection object OBJ is input as the physical feature regarding the material of the inspection object OBJ. Thereafter, the exposure condition of the radiation is acquired by the exposure condition acquisition unit (IX 16) (exposure condition acquisition step: step S12). The exposure condition of the radiation and the imaging time may be acquired by the exposure condition acquisition unit.

The parameter determination unit 220 determines an image processing parameter by referring to the exposure information stored in the storage unit 24 (parameter determination step: step S13). The parameter determination unit 220 selects the exposure information on the basis of the input physical feature and determines the image processing parameter according to shading corresponding to the exposure condition in the selected exposure information. The determination of the image processing parameters will be described in detail below.

Required exposure information is stored in the storage unit 24 in advance (storage step). Further, the exposure information of the storage unit 24 can be added and changed by the user. Thereafter, the defect candidate extraction unit 222 performs image processing on the received light image on the basis of the determined image processing parameters to extract defect candidate images (image processing step: step S14). Thereafter, the defect candidate image and the received light image are displayed on the display unit 18 (step S15). Then, the image interpreter performs interpretation of the received light image and the defect candidate image displayed on the display unit 18 to perform diagnosis (step S16). Thereafter, in a case where the inspection by the image interpreter is completed and an instruction to end the display is input by the manipulation unit 14, a result of the defect diagnosis is stored as diagnosis result data in the inspection object inspection result data D10 and stored in the storage unit 24 (step S17).

Next, a specific example regarding a determination of the image processing parameters will be described.

Figure 11:
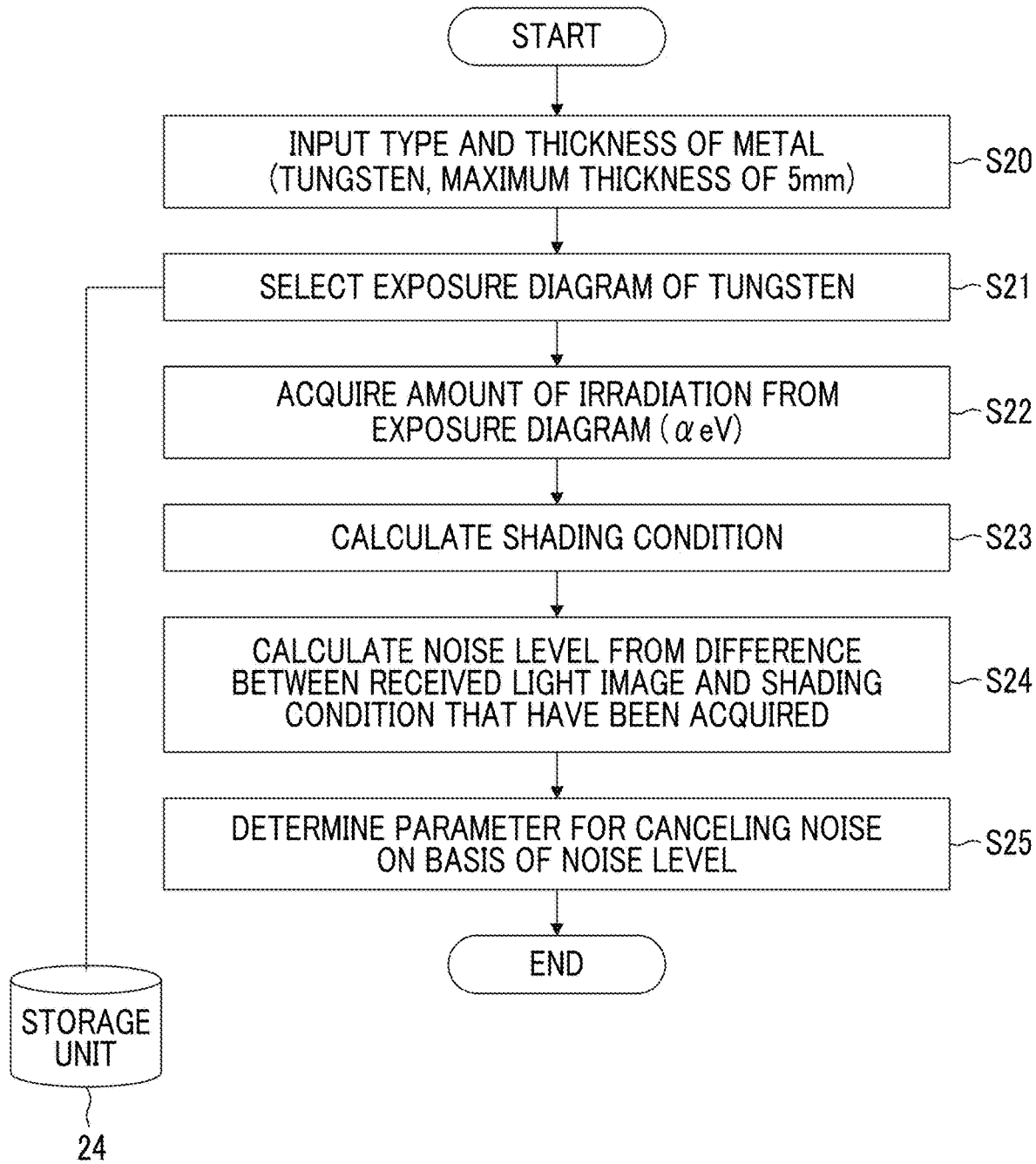
FIG. 11 is a flowchart illustrating a specific example regarding a determination of an image processing parameter.

FIG. 11 is a flowchart illustrating a specific example regarding the determination of image processing parameters.

First, a type of metal (tungsten or atomic number 74) which is the physical feature of the inspection object OBJ and a maximum thickness (5 mm) of the inspection object OBJ are received by the input unit via the input screen 50 (FIG. 8) (step S20). Thereafter, the parameter determination unit 220 selects an exposure diagram (exposure information) of the tungsten from the storage unit 24 on the basis of the received type of metal (step S21). Then, the exposure condition acquisition unit acquires an exposure condition ($\alpha$ eV) by calculating an appropriate exposure condition on the basis of the thickness and the material which are the physical features of the inspection object OBJ and the exposure information stored in the storage unit 24 (step S22). Specifically, the exposure condition acquisition unit acquires the appropriate exposure condition (tube voltage $\alpha$ eV) from the input maximum thickness (5 mm) of the inspection object OBJ using the exposure diagram of the tungsten. In a case where tag information (illumination condition data: see FIG. 3) is attached to the received light image, the exposure condition may be acquired from the tag information.

Then, the parameter determination unit 220 calculates a shading condition corresponding to the thickness of the inspection object OBJ on the basis of the exposure condition acquired by the exposure condition acquisition unit, the physical features received by the input unit, and the exposure information stored in the storage unit 24 (step S23). Specifically, the parameter determination unit 220 calculates a shading condition corresponding to the thickness of the inspection object OBJ from the exposure condition ($\alpha$ eV) acquired by the exposure condition acquisition unit and the exposure diagram of the tungsten. Here, the shading condition is information on the shading according to the thickness of the inspection object OBJ, and can be calculated from the exposure condition and the exposure diagram. Thereafter, the parameter determination unit 220 calculates a noise level of the received light image on the basis of the calculated shading condition and the received light image acquired by the image acquisition unit (step S24). For example, the parameter determination unit 220 can calculate the noise level from a difference between the shading condition and the received light image. The parameter determination unit 220 estimates, as noise or unevenness, a shading vibration in the received light image not linked with the thickness of the inspection object OBJ, to calculate the noise level. Here, the noise level is a measure indicating a magnitude of noise. Then, the parameter determination unit 220 determines image processing parameters on the basis of the calculated noise level (step S25). For example, the parameter determination unit 220 selects a parameter for canceling the noise from a parameter list on the basis of the calculated noise level.

Even in a case where the image acquisition unit acquires a plurality of the received light images of the inspection object OBJ, the above-described steps are performed on each received light image. That is, first, the exposure condition acquisition unit acquires the exposure condition of each of the plurality of received light images. The parameter determination unit calculates the shading condition of each of the plurality of received light images and calculates a noise level on the basis of the calculated shading condition of the plurality of received light images and the plurality of received light images acquired by the image acquisition unit, to thereby determine image processing parameters.

Each configuration and function described above can be appropriately realized by any hardware, any software, or a combination of the hardware and the software. For example, the present invention can also be applied to a program causing a computer to execute the above-described processing steps (processing procedure), a computer-readable recording medium (non-transitory tangible medium) on which such a program is recorded, or a computer capable of installing such a program.

Second Embodiment

Next, a second embodiment of the present invention will be described. In the second embodiment, a thickness for each local area of the inspection object OBJ is calculated, and an image processing parameter according to the calculated thickness for each local area is determined.

Figure 12:
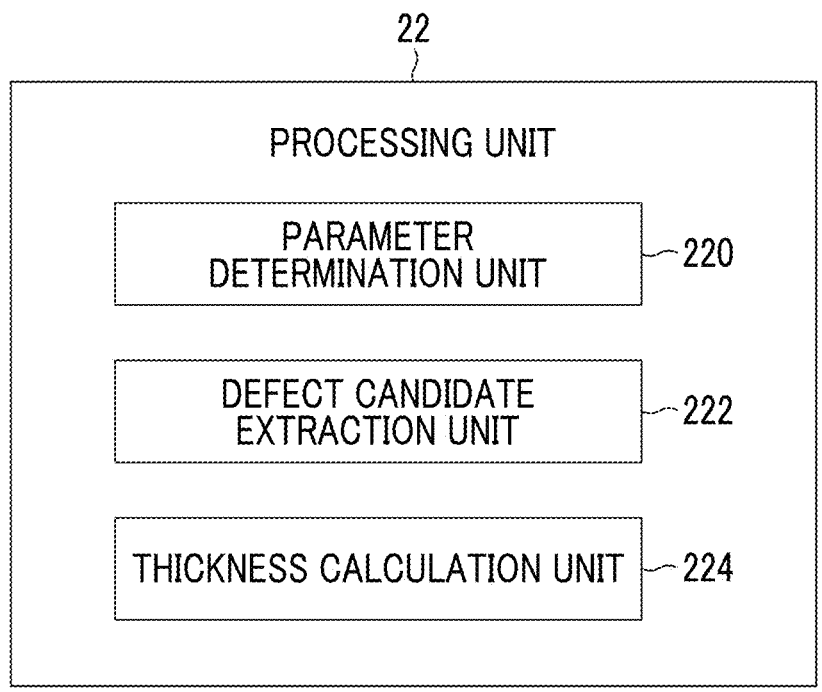
FIG. 12 is a block diagram illustrating an example of a function of a processing unit.

FIG. 12 is a block diagram illustrating a functional configuration example of the processing unit 22 according to this embodiment. In FIG. 2, portions that have already been described are denoted with the same reference numerals and description thereof will be omitted. The processing unit 22 illustrated in FIG. 12 includes a parameter determination unit 220, a defect candidate extraction unit 222, and a thickness calculation unit 224.

The thickness calculation unit 224 calculates the thickness of each local area of the inspection object OBJ on the basis of the received light image acquired by the image acquisition unit, the exposure condition acquired by the exposure condition acquisition unit, and the exposure information stored in the storage unit 24. Specifically, the thickness calculation unit 224 calculates the thickness of each local area of the inspection object OBJ from the received light image acquired by the image acquisition unit (information indicating reflectance and transmittance (transmission attenuation) of irradiation light at the time of imaging of the inspection object OBJ) and the exposure condition acquired by the exposure condition acquisition unit using a relationship of the thickness of the inspection object OBJ in the exposure information, the irradiation condition, and the shading of the received light image.

The parameter determination unit 220 determines the image processing parameter on the basis of the thickness of each local area of the inspection object OBJ calculated by the thickness calculation unit 224, the exposure condition acquired by the exposure condition acquisition unit, the physical features received by the input unit, and the exposure information stored in the storage unit 24. The parameter determination unit 220 can determine, for example, an image processing condition of strength of a noise removal process for each area by determining the image processing parameters including the thickness of each local area. The parameter determination unit 220 can calculate an image processing parameter on the basis of the calculation table and the thickness of each local area in a case where a calculation table (for example, a noise level) in which the thickness of the inspection object OBJ and the image processing parameter are associated with each other is stored in the storage unit 24.

Figure 13:
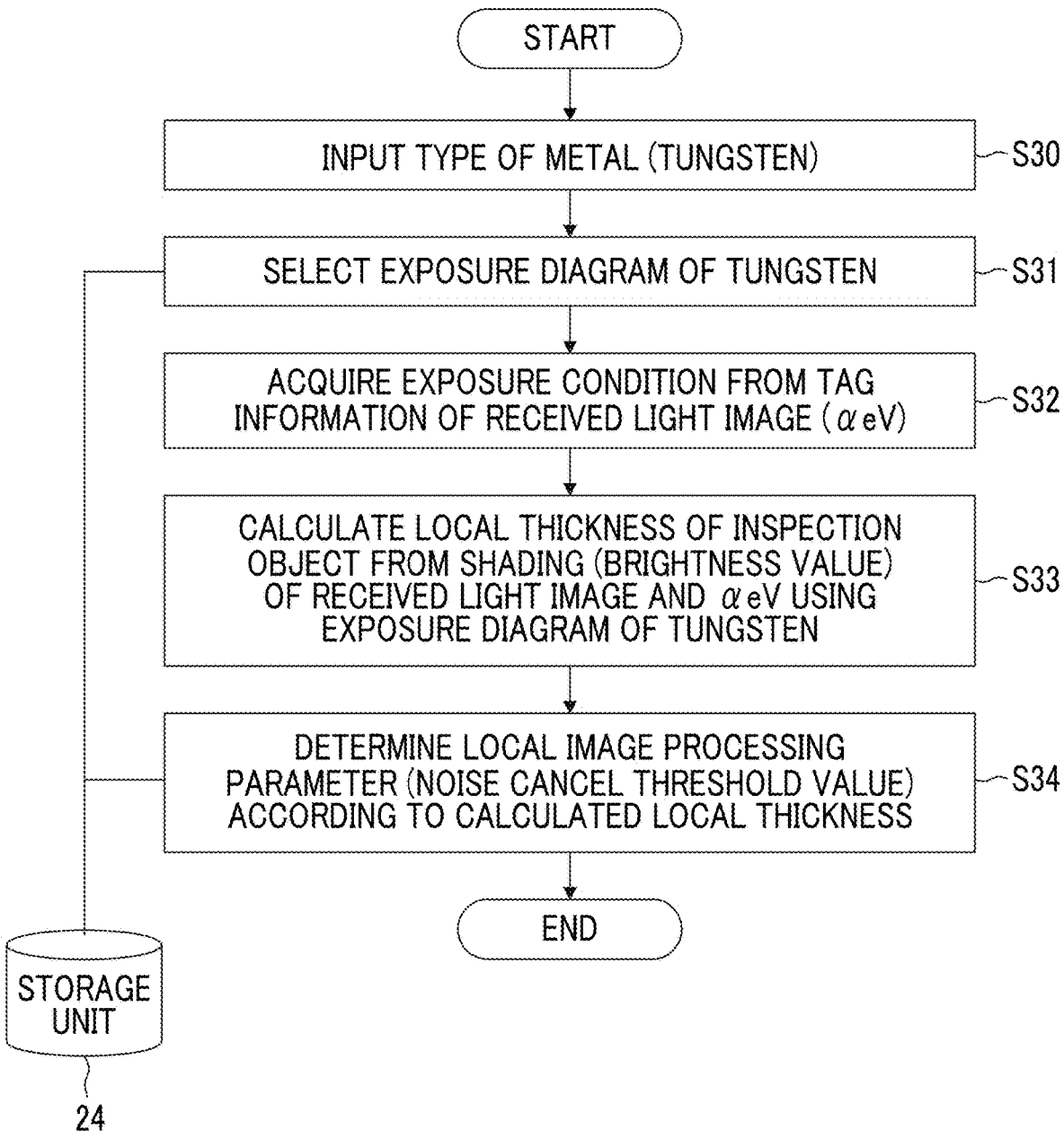
FIG. 13 is a flowchart illustrating a specific example regarding a determination of an image processing parameter.

FIG. 13 is a flowchart illustrating a specific example regarding a determination of image processing parameters in a case where a calculation table of image processing parameters is stored in the storage unit 24.

In the case illustrated in FIG. 13, it is assumed that a relationship between the thickness of the inspection object OBJ and the exposure condition (eV), and the noise level is known in advance and stored as a calculation table in the storage unit 24.

First, the type of metal which is the physical feature of the inspection object OBJ is received as the tungsten by the input unit (step S30). Thereafter, the parameter determination unit selects an exposure diagram (exposure information) of the tungsten from the storage unit 24 (step S31). The exposure condition acquisition unit acquires the fact that the exposure condition is α eV from the tag information of the received light image (step S32). Then, the thickness calculation unit 224 calculates a local thickness of the inspection object OBJ from values of shading (brightness value) of the received light image and α eV using the exposure diagram of the tungsten (step S33). Thereafter, a local image processing parameter (a noise cancel threshold value) is determined according to the calculated local thickness (step S34).

Third Embodiment

Next, a third embodiment of the defect inspection device 10 will be described.

Figure 14:
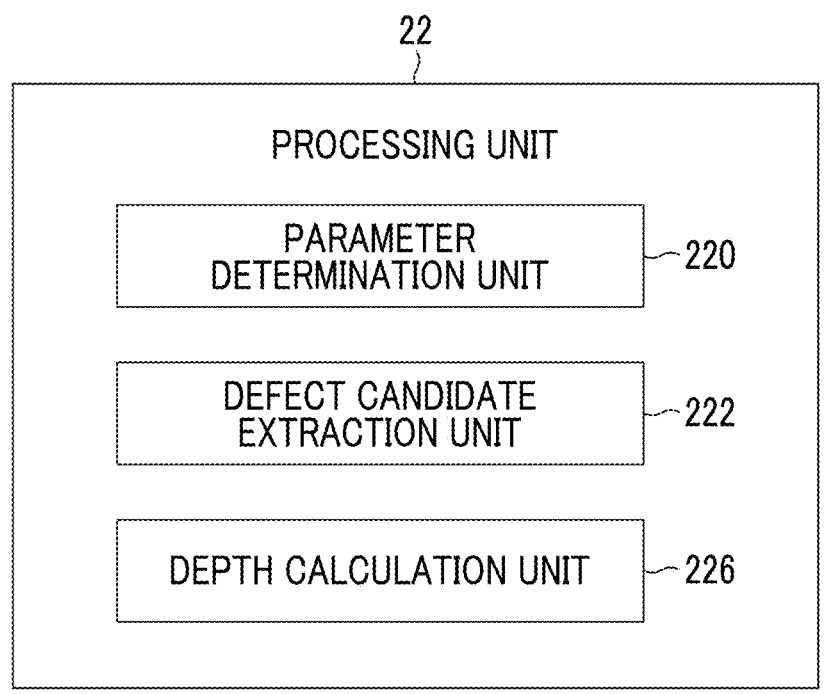
FIG. 14 is a block diagram illustrating an example of a function of a processing unit.

FIG. 14 is a block diagram illustrating an example of functions of a processing unit 22 of the third embodiment. Portions that have already been described in FIG. 2 are denoted by the same reference numerals and description thereof will be omitted.

The processing unit 22 of the third embodiment includes a parameter determination unit 220, a defect candidate extraction unit 222, and a depth calculation unit 226.

The depth calculation unit 226 calculates a depth from a surface of the inspection object OBJ to a position of the defect candidate on the basis of the received light image acquired by the image acquisition unit, the exposure condition acquired by the exposure condition acquisition unit, and the exposure information stored in the storage unit 24.

FIGS. 15 and 16 are diagrams illustrating the calculation of the depth performed by the depth calculation unit 226. In FIGS. 15 and 16, a difference between the received light images obtained according to the position of the defect D will be described, in which the inspection object OBJ is irradiated with X rays. In FIG. 15, the defect D in the inspection object OBJ is located at a depth M from the surface of the inspection object OBJ. Further, in FIG. 16, the defect D in the inspection object OBJ is located at a depth N from the surface of the inspection object OBJ. Further, in FIGS. 15 and 16, a front view of a rectangular parallelepiped inspection object OBJ, and a received light image 53 and a received light image 54 obtained from transmitted light after X-rays are radiated are illustrated. Since the depth M (FIG. 15) is deeper than the depth N (FIG. 16), the image corresponding to the defect D in the received light image 53 is an image of which an outline (an edge) is clearer than the image corresponding to the defect D of the received light image 54. On the other hand, since the depth N (FIG. 16) is shallower than the depth M (FIG. 15), the image corresponding to the defect D in the received light image 54 is an image of which an outline is blurred as compared with the image corresponding to the defect D of the received light image 53.

In an example of the calculation of the depth of the depth calculation unit 226, the depth calculation unit 226 calculates the depth of the defect on the basis of information on the shading in the exposure information stored in the storage unit 24, the received light image acquired by the image acquisition unit, and the exposure condition acquired in the exposure condition acquisition unit. Further, as another example, the information on the received light image corresponding to the defect D located at a plurality of depths may be stored in the storage unit 24 in advance, and the depth calculation unit 226 may calculate the depth on the basis of information on the received light image corresponding to the defect D located at the plurality of depths stored in the storage unit 24.

Although the examples of the present invention have been described above, it is obvious that the present invention is not limited to the above-described embodiments, and various modifications can be made without departing from the spirit of the present invention.

EXPLANATION OF REFERENCES 10 defect inspection device
12 control unit
14 manipulation unit
16 I/F 18 display unit
20 buffer memory
22 processing unit
24 storage unit
50 input screen
100 imaging system
102 imaging control unit
104 imaging manipulation unit
106 image recording unit
108 camera
110 radiation source
112 radiation source
114 imaging room
200 product database
220 parameter determination unit
222 defect candidate extraction unit
224 thickness calculation unit
226 depth calculation unit
Step S10 to Step S17 step of defect inspection method
Step S20 to Step S25 step of calculating image processing parameter
Step S30 to Step S35 step of calculating image processing parameter

What is claimed is:

1. A defect inspection device comprising:
an image acquisition unit that acquires a received light image created on the basis of transmitted light or reflected light of an inspection object obtained by irradiating the inspection object with radiation;
an input unit that receives an input of a physical feature including at least a material of the inspection object;
an exposure condition acquisition unit that acquires an exposure condition of the radiation;
a storage unit that stores exposure information that is a relationship among the physical feature, an irradiation condition of the radiation, and shading of the received light image;
a parameter determination unit that determines an image processing parameter for the received light image on the basis of the exposure condition acquired by the exposure condition acquisition unit, the physical feature received by the input unit, and the exposure information stored in the storage unit;
an image processing unit that extracts a defect candidate image which is an image corresponding to a defect candidate of the inspection object from the received light image by performing image processing of the received light image on the basis of the image processing parameter determined by the parameter determination unit; and
a thickness calculation unit that calculates a thickness of each local area of the inspection object on the basis of the received light image acquired by the image acquisition unit, the exposure condition acquired by the exposure condition acquisition unit, and the exposure information stored in the storage unit,
wherein the parameter determination unit determines the image processing parameter corresponding the thickness of each local area of the inspection object calculated by the thickness calculation unit.

2. The defect inspection device according to claim 1, wherein the parameter determination unit calculates a shading condition corresponding to a thickness of the inspection object on the basis of the exposure condition acquired by the exposure condition acquisition unit, the physical feature received by the input unit, and the exposure information stored in the storage unit and calculates a noise level of the received light image on the basis of the calculated shading condition and the received light image acquired by the image acquisition unit to determine the image processing parameter.

3. The defect inspection device according to claim 2, wherein the image acquisition unit acquires a plurality of the received light images of the inspection object, the exposure condition acquisition unit acquires the exposure condition of each of the plurality of received light images, and the parameter determination unit calculates the shading condition of each of the plurality of received light images and calculates the noise level on the basis of the calculated shading condition of the plurality of received light images and the plurality of received light images acquired by the image acquisition unit, to determine the image processing parameters.

4. The defect inspection device according to claim 1, wherein the storage unit stores a plurality of pieces of the exposure information.

5. The defect inspection device according to claim 1, wherein the storage unit stores the exposure information based on an exposure diagram.

6. The defect inspection device according to claim 1, further comprising:
a depth calculation unit that calculates a depth from a surface of the inspection object to a position of the defect candidate on the basis of the received light image acquired by the image acquisition unit, the exposure condition acquired by the exposure condition acquisition unit, and the exposure information stored in the storage unit.

7. The defect inspection device according to claim 1, wherein the physical feature regarding the material includes at least one of a density or an atomic number of the inspection object.

8. The defect inspection device according to claim 1, wherein the irradiation condition is at least one of an irradiation intensity or an irradiation time of the radiation.

9. The defect inspection device according to claim 1, wherein the input unit receives an input of a thickness of the inspection object as the physical feature, and the exposure condition acquisition unit calculates an appropriate exposure condition on the basis of the thickness and the material which are the physical features of the inspection object, and the exposure information stored in the storage unit to thereby acquire the exposure condition.

10. The defect inspection device according to claim 1, wherein the exposure condition acquisition unit acquires information on a state of a radiation source in a case where the received light image acquired by the image acquisition unit has been created, and calculates the exposure condition on the basis of the information on the state of the radiation source.

11. A defect inspection device comprising:
an image acquisition unit that acquires a received light image created on the basis of transmitted light or reflected light of an inspection object obtained by irradiating the inspection object with radiation;
an input unit that receives an input of a physical feature including at least a material of the inspection object;
an exposure condition acquisition unit that acquires an exposure condition of the radiation;

a storage unit that stores exposure information that is a relationship among the physical feature, an irradiation condition of the radiation, and shading of the received light image;

a parameter determination unit that determines an image processing parameter for the received light image on the basis of the exposure condition acquired by the exposure condition acquisition unit, the physical feature received by the input unit, and the exposure information stored in the storage unit;

an image processing unit that extracts a defect candidate image which is an image corresponding to a defect candidate of the inspection object from the received light image by performing image processing of the received light image on the basis of the image processing parameter determined by the parameter determination unit; and a thickness calculation unit that calculates a thickness of each local area of the inspection object on the basis of the received light image acquired by the image acquisition unit, the exposure condition acquired by the exposure condition acquisition unit, and the exposure information stored in the storage unit, wherein the storage unit further stores a noise level according to the thickness of the inspection object, and the parameter determination unit determines the image processing parameter for each local area of the inspection object from the thickness of each local area of the inspection object calculated by the thickness calculation unit and the noise level stored in the storage unit.

12. The defect inspection device according to claim 11, wherein the storage unit stores a plurality of pieces of the exposure information.

13. The defect inspection device according to claim 11, wherein the storage unit stores the exposure information based on an exposure diagram.

14. The defect inspection device according to claim 11, further comprising:
a depth calculation unit that calculates a depth from a surface of the inspection object to a position of the defect candidate on the basis of the received light image acquired by the image acquisition unit, the exposure condition acquired by the exposure condition acquisition unit, and the exposure information stored in the storage unit.

15. The defect inspection device according to claim 11, wherein the physical feature regarding the material includes at least one of a density or an atomic number of the inspection object.

16. The defect inspection device according to claim 11, wherein the irradiation condition is at least one of an irradiation intensity or an irradiation time of the radiation.

17. A defect inspection method comprising:
an image acquisition step of acquiring a received light image created on the basis of transmitted light or reflected light of an inspection object obtained by irradiating the inspection object with radiation;
an input step of receiving an input of a physical feature including at least a material of the inspection object;
an exposure condition acquisition step of acquiring an exposure condition of the radiation;
a storage step of storing exposure information that is a relationship among the physical feature, an irradiation condition of the radiation, and shading of the received light image;
a parameter determination step of determining an image processing parameter for the received light image on the basis of the exposure condition acquired in the exposure condition acquisition step, the physical feature received in the input step, and the exposure information stored in the storage step;
an image processing step of extracting a defect candidate image which is an image corresponding to a defect candidate of the inspection object from the received light image by performing image processing of the received light image on the basis of the image processing parameter determined in the parameter determination step; and
a thickness calculation step of calculating a thickness of each local area of the inspection object on the basis of the received light image acquired in the image acquisition step, the exposure condition acquired in the exposure condition acquisition step, and the exposure information stored in the storage step,
wherein the parameter determination step determines the image processing parameter corresponding the thickness of each local area of the inspection object calculated in the thickness calculation step.

18. A non-transitory computer-readable tangible medium storing a program which causes a computer to realize the defect inspection method according to claim 17.

19. A defect inspection method comprising:
an image acquisition step of acquiring a received light image created on the basis of transmitted light or reflected light of an inspection object obtained by irradiating the inspection object with radiation;
an input step of receiving an input of a physical feature including at least a material of the inspection object;
an exposure condition acquisition step of acquiring an exposure condition of the radiation;
a storage step of storing exposure information that is a relationship among the physical feature, an irradiation condition of the radiation, and shading of the received light image;
a parameter determination step of determining an image processing parameter for the received light image on the basis of the exposure condition acquired in the exposure condition acquisition step, the physical feature received in the input step, and the exposure information stored in the storage step;
an image processing step of extracting a defect candidate image which is an image corresponding to a defect candidate of the inspection object from the received light image by performing image processing of the received light image on the basis of the image processing parameter determined in the parameter determination step; and
a thickness calculation step of calculating a thickness of each local area of the inspection object on the basis of the received light image acquired in the image acquisition step, the exposure condition acquired in the exposure condition acquisition step, and the exposure information stored in the storage step,
wherein the storage step includes further storing a noise level according to the thickness of the inspection object, and
the parameter determination step includes determining the image processing parameter for each local area of the inspection object from the thickness of each local area of the inspection object calculated in the thickness calculation step and the noise level stored in the storage step.

20. A non-transitory computer-readable tangible medium storing a program which causes a computer to realize the defect inspection method according to claim 19.

* * * * *